(12) United States Patent
Bernhard et al.

(10) Patent No.: US 8,684,455 B2
(45) Date of Patent: Apr. 1, 2014

(54) BACKREST OF SEAT OR A BENCH WITH AN INTEGRATED WIND DEFECTOR

(75) Inventors: Sabine Bernhard, Kalsdorf (AT); Manuel Erlacher, Radenthein (AT); Achim Schmidt, Graz (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 0 days.

(21) Appl. No.: 13/364,864

(22) Filed: Feb. 2, 2012

(65) Prior Publication Data
US 2012/0193949 A1 Aug. 2, 2012

(30) Foreign Application Priority Data
Feb. 2, 2011 (DE) .................. 10 2011 010 055

(51) Int. Cl.
*B60J 1/20* (2006.01)
*B62D 37/02* (2006.01)
*A47C 7/72* (2006.01)

(52) U.S. Cl.
USPC ................. 297/184.11; 296/91; 296/180.1

(58) Field of Classification Search
USPC ............ 297/184.1, 184.11; 296/85, 180.1, 91
See application file for complete search history.

(56) References Cited

U.S. PATENT DOCUMENTS

| 6,062,625 A * | 5/2000 | Elelnrieder et al. ........ 296/85 X |
| 6,095,590 A * | 8/2000 | Matsuda et al. ........... 296/180.1 |
| 7,086,678 B2 * | 8/2006 | Schlecht .................... 296/85 X |
| 7,784,853 B2 * | 8/2010 | Erb et al. .................. 296/180.1 |

FOREIGN PATENT DOCUMENTS

DE 102 20 029 A1 11/2003
FR 2 926 253 A1 7/2009

\* cited by examiner

*Primary Examiner* — Anthony D Barfield
(74) *Attorney, Agent, or Firm* — Jordan IP Law, LLC; Todd A. Vaughn

(57) ABSTRACT

A motor vehicle seat including a seat portion having a wind deflector provided in a storage compartment thereof, the wind deflector being mounted for movement between a rest position in the storage compartment and an active position out of the storage compartment. The seat portion also has a rotational joint configured to permit rotation of the seat portion between a first orientation in which the seat portion permits a user to assume a seated position, and a second orientation in which the seat portion permits the wind deflector to assume the active position.

17 Claims, 4 Drawing Sheets

(a)     (b)     (c)

BACKREST OF SEAT OR A BENCH WITH AN INTEGRATED WIND DEFECTOR

CROSS-REFERENCE TO RELATED APPLICATIONS

The present application claims priority under 35 U.S.C. §119, to German Patent Application No. 10 2011 010 055.5 (filed on Feb. 2, 2011), which is hereby incorporated by reference in its entirety.

FIELD OF THE INVENTION

The invention relates to a back rest for a seat or a seat bench of a motor vehicle, whereby the back seat includes an integrated wind deflector. Furthermore, the invention relates to a seat/seat bench having a seat surface and a back rest of the stated type. Finally, the invention relates to a motor vehicle having a seat or a seat bench of the stated type.

BACKGROUND OF THE INVENTION

Aside from the function of a seat or a bench in a motor vehicle as a seating opportunity, these elements frequently also fulfill other functions. For example, a wind deflector can be integrated into a rear bench of a convertible or of an open vehicle, which deflector can be tilted up if needed, in order to protect the passengers of the vehicle from a bothersome air stream.

For example, DE 102 20 029 A1 discloses a wind deflector for a convertible for this purpose, having three planar main parts that are connected at facing edge regions, so as to pivot about a transverse vehicle axis. The main parts are vertically disposed, in a storage position, behind at least one rear seat backrest that is situated in the normal position. After at least one upper backrest region of the rear seat backrest has been adjusted, these parts can be adjusted into a main active position, by way of an adjustment position. In the main adjustment position, two main parts are disposed approximately horizontally one behind the other, above the seat parts of the rear seats, and one main part projects approximately vertically upward from the front region of a horizontal main part.

A disadvantage of this solution is the relatively complicated mechanics that are required to move the wind deflector between the rest position and the use position.

DE 101 21 839 A1 discloses another wind deflector for a convertible. The wind deflector lies in a stowed carry-along position in a recess in the back plate of the upper region of the backseat part of the rear seat region, and is articulated onto the backrest part, so as to pivot on it about a horizontal axis disposed at its upper end. From the carry-along position, the wind deflector can be adjusted into an essentially upright use position.

A disadvantage of this solution is that the backrest must be lifted up to activate the wind deflector. Because the backrest has a relatively great weight, this process is correspondingly difficult.

Finally, DE 195 46 083 C2 discloses a convertible having a wind deflector that is integrated, in its stowed rest position, into a backrest part of the rear seat region. The wind deflector has a cover of the rear seat region assigned to it. To fold out the wind deflector, a backrest section to which the wind deflector is attached is moved into a covering position that covers the rear seat region approximately horizontally.

Here again the backrest must be lifted up to activate the wind deflector. In an alternative embodiment, a separate covering plate is furthermore required to cover the rear seat region.

SUMMARY OF THE INVENTION

It is therefore the task of the present invention to indicate an improved backrest having a wind deflector, for a seat or a seat bench of a motor vehicle. In particular, a technically simple and low-effort possibility for activating the wind deflector is supposed to be created.

The task of the invention can be accomplished by way of a backrest of the type stated initially, in which: the backrest includes a mechanism, such as a first rotational joint, located in an upper region thereof, for rotatable mounting in a mounting accommodation in such a manner that the backrest can be pivoted upwardly from a first position (e.g., a seating position) into a second position above a seat surface of the seat or the seat bench, and a wind deflector configured for movement in the second position of the backrest, from a rest position into an active position.

The task of the invention can furthermore accomplished with a seat/a seat bench of the type stated initially, which includes a backrest in accordance with the invention. In this way, a seat or a seat bench, respectively, having a seat surface and a backrest is created, whereby a wind deflector is integrated into the backrest, the backrest includes a mechanism, such as a first rotational joint, provided in an upper region thereof, for rotatable mounting in a mounting accommodation in such a manner that the backrest can be pivoted upwardly from a first position (e.g., a seating position) into a second position above a seat surface of the seat or the seat bench, and the wind deflector configured for movement in the second position of the backrest, from a rest position into an active position.

The task of the invention can also be accomplished by way of a motor vehicle having a seat or a seat bench in accordance with the invention. In this way, a motor vehicle includes a seat or a seat bench, respectively, having a seat surface and a backrest, whereby a wind deflector is integrated into the backrest, the backrest including a mechanism, such as a first rotational joint, provided in the upper region thereof, for rotatable mounting in a mounting accommodation in such a manner that the backrest can be pivoted upwardly from a first position (e.g., a seating position) into a second position above a seat surface of the seat or the seat bench, and the wind deflector is configured for movement in the second position of the backrest, from a rest position into an active position.

In accordance with the invention, the disadvantages of the related art mentioned initially are overcome, because a technically simple solution is indicated, by way of the rotational joint provided in the upper region of the backrest, so that the backrest can be tilted forward or upward, respectively, in a force-saving manner, in order to cover the rear seat region. This is because the backrest can be grasped at the lower edge when it is tilted up, so that because of the law of leverage, practically only half the weight of the backrest needs to be lifted. It is, therefore, possible to do without motors that lift the backrest. Of course, a motor drive is not excluded in accordance with the invention. For the reasons already mentioned, this drive also does not have to be designed to be very strong. The wind deflector can already be moved from a rest position into an active position or use position, respectively, while the backrest is being tilted up, or only once the backrest has assumed the second position. For the reasons mentioned, the invention is excellently suited for convertibles and open and/or exposed roof cars.

Advantageous embodiments and further developments of the invention are evident from the dependent claims and from the description in conjunction with the figures.

It is advantageous if the backrest, in the second position, is oriented essentially parallel to the seat surface and at a distance from the same. In this manner, the rear seat region is covered particularly well. Furthermore, the tilted-up backrest can also function as a shelf surface.

It is advantageous if the backrest and/or the seat or the seat bench, respectively, and/or the vehicle includes a mechanism configured to fix the backrest in place in the seating position or the second position, respectively. In this manner, the backrest is prevented from unintentionally being tilted away out of the selected position, or, if applicable, a motor drive can be relieved of stress. Particularly when the vehicle drives over bumps or potholes, swinging of the backrest out of the tilted-up position can lead to significant forces. If locking of the backrest is now provided, the motor drive does not have to absorb these forces and can be dimensioned to be correspondingly smaller. All known elements, such as movable bolts, hooks, belts, ratchet mechanisms and the like are possible as locking mechanisms.

It is also advantageous if the backrest has a mechanism configured to fix, lock or otherwise manipulate the wind deflector in place between the rest position and the active position. Here, what was said for the variant mentioned above applies analogously. For example, the dynamic pressure on the wind deflector could lead to the result that the deflector is undesirably pushed into the rest position. A locking mechanism can prevent this.

It is advantageous if the wind deflector is connected with the backrest by way of a second rotational joint. This is a particularly simple possibility for connecting the wind deflector with the backrest in such a manner that the latter can be moved from a rest position into an active position. This variant of the invention can, therefore, be produced inexpensively and is furthermore not very susceptible to defects, because of the low technical complexity.

It is particularly advantageous if the second rotational joint is disposed in the lower region of the backrest, with reference to its seating position. In this manner, the wind deflector comes to lie directly behind the front seats in the active position, and is therefore particularly effective.

It is also advantageous if the second rotational joint is disposed in the center region of the backrest, with reference to its seating position. In the case of this variant, a particularly convenient movement sequence during activation of the wind deflectors is made possible, because the user grasps the backrest at the lower edge to tilt it up, and can then also tilt up the wind deflector in one continuous movement. Furthermore, in this variant of the invention, the position of the wind deflector is variable, i.e., the wind deflector can be disposed at practically any desired distance from the front seats.

It is furthermore advantageous if the wind deflector is connected with the backrest by way of joint rods, where the wind deflector, the backrest and two joint rods form a joint rectangle. This variant of the invention offers particular flexibility in the placement of the wind deflector. For example, the latter can be positioned above the backrest, or even displaced somewhat downward, in the active position.

It is advantageous if the wind deflector is integrated into a backrest surface of the backrest. The wind deflector is then particularly easily accessible.

It is also advantageous if the wind deflector is integrated into a rear surface that faces away from the backrest surface of the backrest. The wind deflector then does not disturb either the optics of the backrest or the seat comfort.

It is advantageous if the wind deflector forms part of the backrest surface or of the rear surface. The wind deflector thereby fulfills a dual function, and for this reason, production of the backrest is particularly inexpensive.

Finally, it is also advantageous if the wind deflector is covered by a cover flap in the rest position. In this manner, the wind deflector can be protected. For example, the cover flap can be covered with fabric and form part of the backrest surface. Likewise, the cover flap can form part of the rear surface of the backrest and will thereby protect the wind deflector from damage caused by objects that are stored in the trunk.

The above embodiments and further developments of the invention can be combined in any desired manner.

BRIEF DESCRIPTION OF THE DRAWINGS

The invention is described in more detail in the enclosed figures and drawings, which present an implementation example. The drawings demonstrate.

DETAILED DESCRIPTION OF EMBODIMENTS

Figure 1:
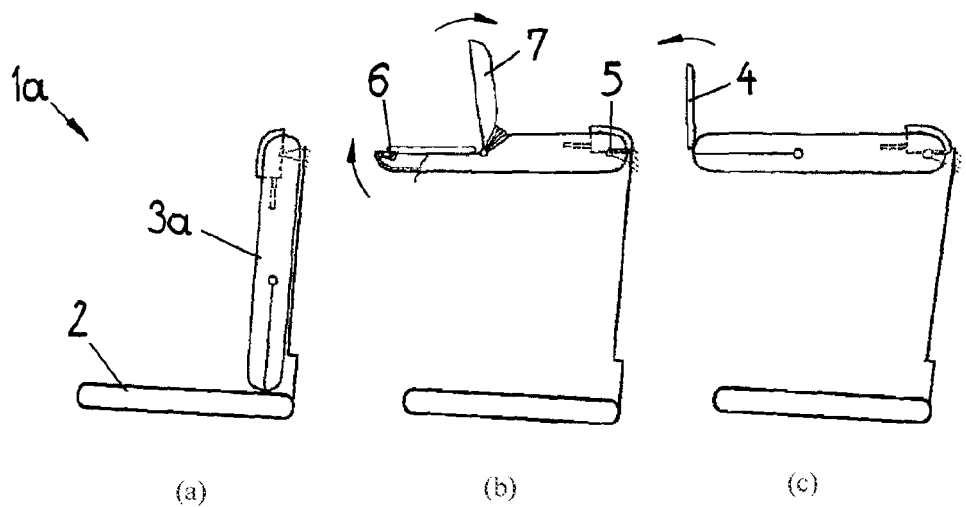
FIGS. 1A to 1C illustrate an embodiment of the invention, in which the wind deflector is tilted forward by approximately 90°.

FIGS. 1A to 1C illustrate in a side view a rear bench/seat 1*a* of a motor vehicle, having a seat surface 2 and a backrest 3*a* which includes an integrated wind deflector 4, in different operating states. In the upper region, the backrest 3*a* includes a first mechanism, such as a first rotational joint 5, for rotatable mounting in a mounting accommodation, in such a manner that the backrest 3*a* can be pivoted from seating position into a second position above a seat surface 2 of the seat or the seat bench. In concrete terms, the backrest 3*a* can include a complete rotational joint, or, as in this example, merely a journal that engages into a bearing shell in the motor vehicle. This means that the backrest 3*a* includes only a part of a complete rotational joint; the remaining portion is provided by the motor vehicle in which the rear bench 1*a* is installed. In equivalent manner, the motor vehicle can also have a journal and the backrest 3*a* can have a corresponding bearing shell. Furthermore, all the rotational joints, hinges, and the like that are known to a person skilled in the art can be used for the rotational joint 5 of the backrest 3*a*.

The backrest 3a furthermore includes a second mechanism, such as a second rotational joint 6, by which the wind deflector 4 is operatively connected to the backrest 3a. In concrete terms, the second rotational joint 6 is disposed in the lower region of the backrest 3a (with reference to the seating position of the backrest 3a illustrated in FIG. 1A). Finally, the backrest 3a includes a moveable cover flap 7 that covers the wind deflector 4 in the rest position.

The function of the arrangement illustrated in FIG. 1 is now as follows. Proceeding from the state illustrated in FIG. 1A, in which the backrest 3a is in a seating position, the backrest 3a is pivoted in a forward or clockwise direction about the first rotational joint 5, into a second position.

As illustrated in FIG. 1B, then the cover flap 7 is manipulated in a clockwise direction to open or otherwise expose the compartment in backrest 3a storing the wind deflector 4 in its rest or inactive position. The backrest 3a is in a horizontal position and is oriented essentially parallel with respect to the seat surface 2 and at a spatial distance from the same.

As illustrated in FIG. 1C, the wind deflector 4 is manipulated from a rest position into an active position. In concrete terms, the wind deflector 4 is pivoted in a forward or clockwise direction about the second rotational joint 6, by about 90°.

In order for not only the backrest 3a but also the wind deflector 4 to maintain the position illustrated, respectively, a mechanism for fixation or locking can be provided. For example, the backrest 3a can be equipped with retractable bolts that engage into holes in the side paneling of the motor vehicle. Likewise, a ratchet mechanism or a ratchet can be provided, particularly for the wind deflector 4.

FIGS. 2A to 2C now illustrate a backrest 3b that is very similar to the backrest 3a illustrated in FIGS. 1A to 1C. In contrast to this, however, the second rotational joint 6 is now disposed in a center region of the backrest 3a. It is advantageous that the dynamic pressure caused by the air stream cannot press the wind deflector 4 into the rest position even if it is not locked in place.

Figure 2:
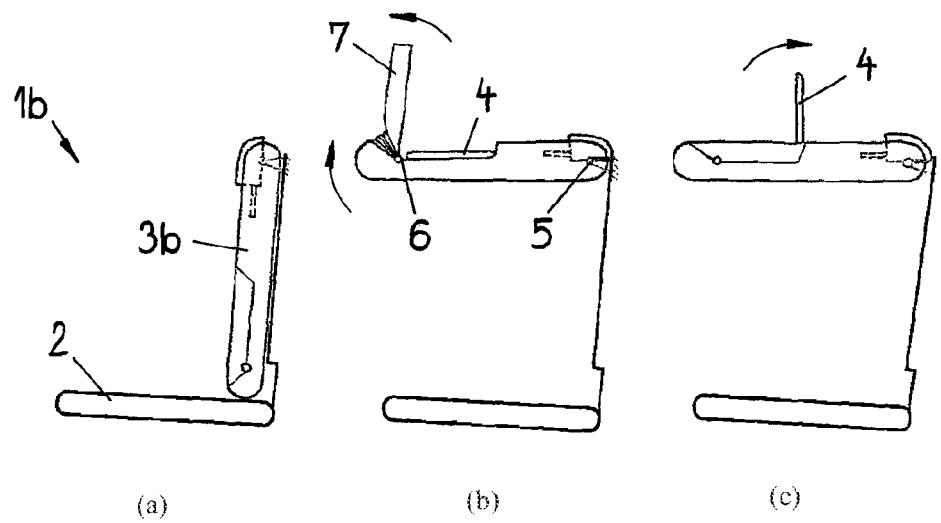
FIGS. 2A to 2C illustrate an embodiment of the invention, in which the wind deflector is tilted backward by approximately 90°.

In FIGS. 1 and 2, the wind deflector 4 is integrated into a backrest surface of the backrest 3a, 3h and is covered by the cover flap 7 there, which forms a part of the backrest surface. Alternatively, it is also conceivable that the cover flap 7 is left out and that then, the wind deflector 4 forms part of or is otherwise integrated into the backrest surface.

Figure 3:
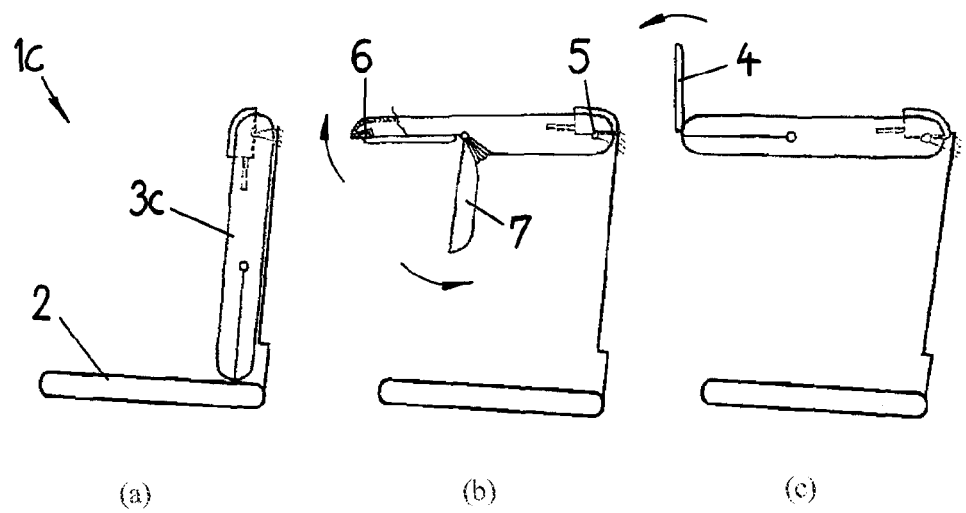
FIG. 3 illustrates an embodiment of the invention, in which the wind deflector is tilted forward by approximately 270°.

FIGS. 3A to 3C illustrate a backrest 3c, which in turn is very similar to the backrest 3a illustrated in FIGS. 1 and 2. The wind deflector 4, however, is now integrated into a rear surface that faces away from the backrest surface of the backrest 3c, and configured for pivoting in a forward/upward or clockwise direction from there, by about 270°.

Figure 4:
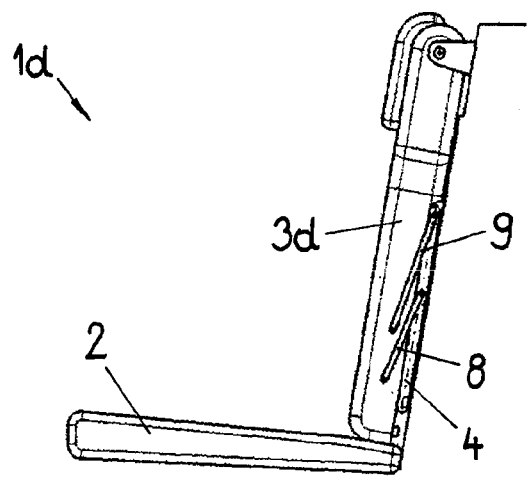
FIG. 4 illustrates an embodiment of the invention, in which the wind deflector is attached to the backrest using joint rods.

FIG. 4 illustrates an embodiment such that the wind deflector 4 is configured for attachment to a backrest 3d. In concrete terms, the wind deflector 4 is connected to the backrest 3d by way of joint rods 8, 9. The wind deflector 4, the backrest 3d, and the joint rods 8, 9 form a joint rectangle or a parallelogram mechanism. This embodiment will now be explained in greater detail using FIGS. 5 to 7.

As illustrated in FIG. 5A, the backrest 3d is in a seating position. As illustrated in FIG. 5B, the backrest 3d is pivoted forward or clockwise about the first rotational joint 5 into a second position. The backrest 3d is in a horizontal position and is oriented essentially parallel to the seat surface 2 and at a spatial distance from the same.

As illustrated in FIG. 5C, in a further step, the wind deflector 4 is moved or otherwise manipulated from a rest position into an active position. The wind deflector 4 is guided by the rods 8, 9 and can be pivoted in forward or clockwise direction.

Figure 5:
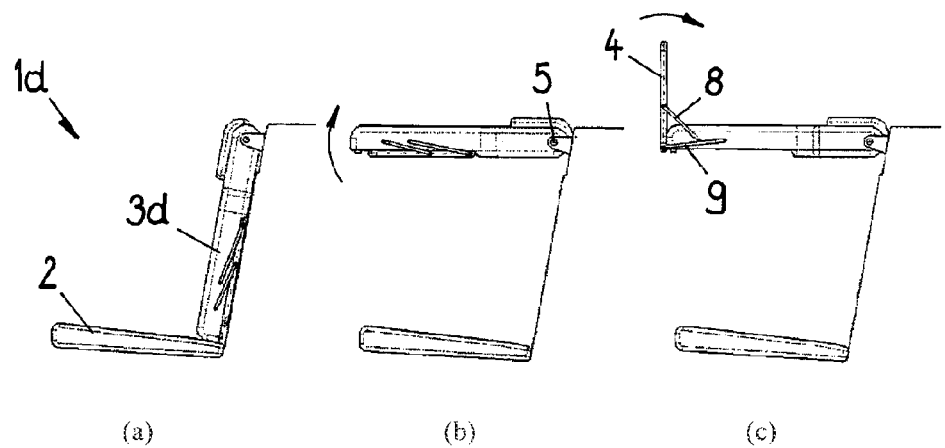
FIGS. 5A to 5B illustrate a movement sequence when tilting out a wind deflector in accordance with FIG. 4.

As illustrated in FIG. 5, the second joint rod 9 lies against the first joint rod 8 in the pivoted-upwardly state of the wind deflector 4, so that the dynamic pressure caused by the air stream actually cannot press the wind deflector 4 into the rest position. A special locking mechanism is, therefore, not necessary. Of course, it would also be possible that the joint rods 8, 9 are disposed in different planes, so that the first joint rod 8 can move through underneath the second joint rod 9. Because the wind deflector 4 can then be pivoted further backward, a locking mechanism can be advantageously provided.

FIGS. 6A and 6B illustrates side and front views, respectively, of the wind deflector 4 in a pivoted-upward position. FIG. 7 illustrates a movement sequence when the wind deflector 4 is pivoted upward, where it can be assumed that the backrest 3d is in the second position.

Figure 6:
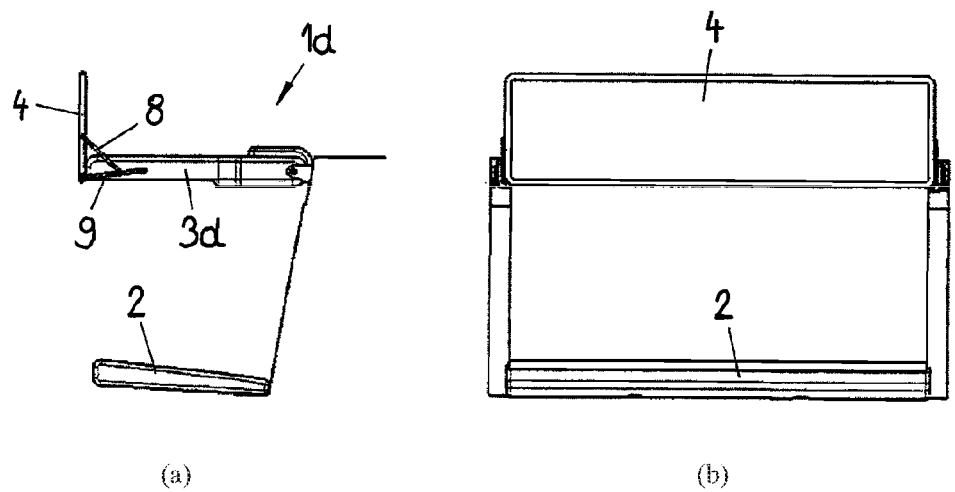
FIGS. 6A and 6B illustrate a side view and a front view, respectively, of the arrangement in accordance with FIG. 4, with the wind deflector tilted outwardly.
Figure 7:
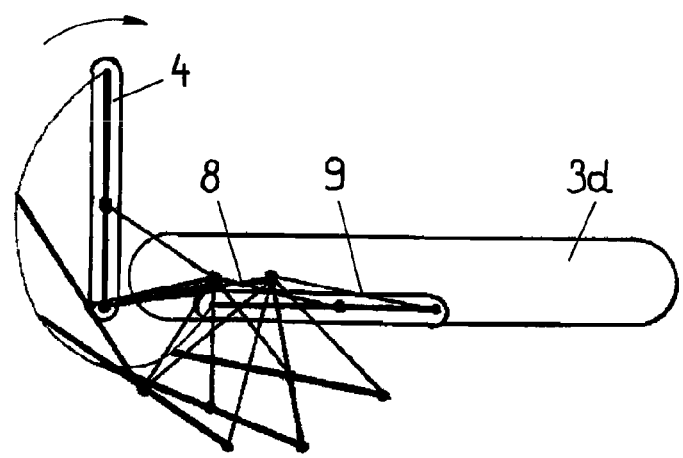
FIG. 7 illustrates a movement sequence when tilting out a wind deflector in the case of the backrest in accordance with FIG. 4.

The wind deflector 4 illustrated in FIGS. 5 to 7 is integrated into a rear surface that faces away from the backrest surface of the backrest 3d. The backrest 3d does not include a cover flap, but of course, this could be provided, similar to the backrest 3c illustrated in FIG. 3.

Figure 8:
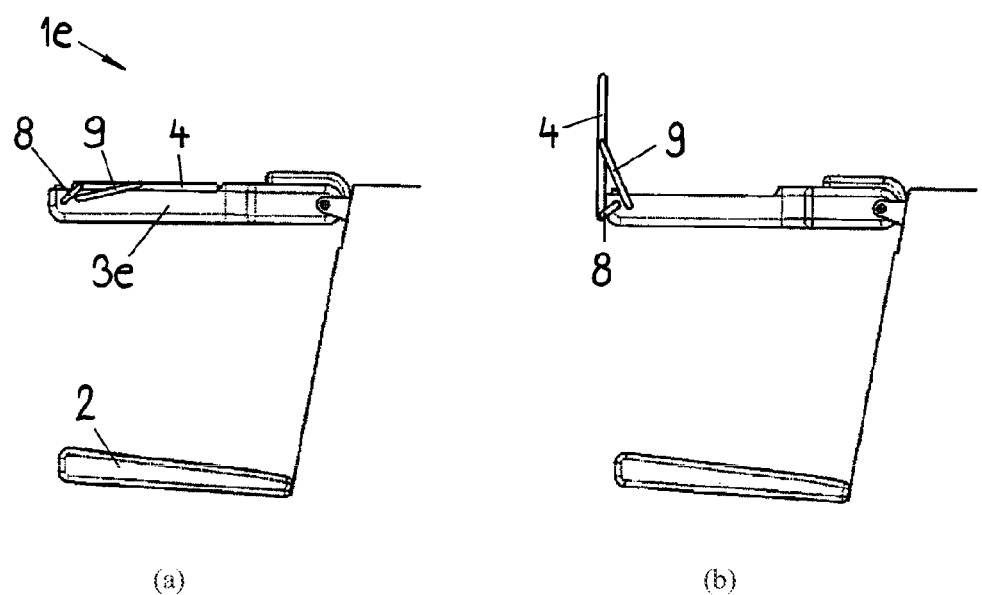
FIGS. 8A and 8B illustrate an embodiment of the invention, in which the wind deflector is attached to the backrest using joint rods, and integrated into the backrest surface.

FIGS. 8A and 8B illustrate a backrest 3e which is very similar to the backrest illustrated in FIGS. 5 to 7. In contrast to this, however, the wind deflector 4 is integrated into a backrest surface of the backrest 3e and is configured for pivoting movement in a forward or clockwise direction by approximately 90°. Alternatively, a cover flap can be provided here, as well, similar to the backrest 3a illustrated in FIG.

In conclusion, it is stated that the components of the figures might be illustrated not true to scale, and that the individual variants illustrated in the figures can also form the object of an independent invention. Position information such as "right," "left," "at the top," "at the bottom," and the like refer to the position of the component, in each instance, as illustrated, and must be changed conceptually accordingly if the stated position is changed. The terms "front" and "rear" are furthermore used in connection with the direction of travel of a vehicle and the usual installation direction of a seat or a bench, respectively. If the direction of travel or the installation direction is changed, again the stated terms must be conceptually adapted accordingly.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor vehicle seat comprising:
a seat portion comprising a wind deflector provided in a storage compartment thereof and mounted for movement between a rest position in the storage compartment and an active position out of the storage compartment, a rotational joint having a pivot axis, the rotational joint configured to permit rotation of the seat portion about the pivot axis between a first orientation in which the seat portion permits a user to assume a seated position, and a second orientation in which the seat portion permits the wind deflector to assume the active position, and a second rotational joint having a second pivot axis permitting movement of the wind deflector between the rest position and the active position.

2. The motor vehicle seat of claim 1, wherein the seat portion comprises a backrest.

3. The motor vehicle seat of claim 1, wherein the wind defector is mounted for rotational movement in a range between 0 to 90°.

4. The motor vehicle seat of claim 1, further comprising a cover flap mounted on the seat portion for movement between a first position covering the wind deflector in the rest position and a second position permitting the wind deflector to assume the active position.

5. The motor vehicle seat of claim 1, further comprising a cover flap integrated with the seat portion such that an exposed surface of cover flap is essentially continuous with an exposed surface of the seat portion in the first orientation of the seat portion.

6. The motor vehicle seat of claim 1, wherein the second rotational joint is disposed at a lower region of the seat portion with reference to the first orientation of the seat portion.

7. The motor vehicle seat of claim 1, wherein the second rotational joint is disposed at a central region of the seat portion with reference to the first orientation of the seat portion.

8. A seat comprising:
a first seat portion;
a second seat portion comprising a first rotational joint at an upper end thereof and having a first pivot axis, the first rotational joint configured to permit rotation of the second seat portion about the first pivot axis between a first orientation in which the second seat portion permits a user to assume a seated position, and a second orientation in which the second seat portion is spaced from and essentially parallel with the first seat portion, and a wind deflector provided in a storage compartment of the second seat portion and mounted for movement between a rest position in the storage compartment and an active position out of the storage compartment; and
a cover flap mounted on the second seat portion for movement between a first position covering the wind deflector in the rest position and a second position permitting the wind deflector to assume the active position,
wherein the cover flap is integrated with the second seat portion such that an exposed surface of cover flap is essentially continuous with an exposed surface of the second seat portion in the first orientation of the second seat portion.

9. The seat of claim 8, wherein the seat portion further comprises a second rotational joint having a second pivot axis permitting movement of the wind deflector about the second pivot axis between the rest position and the active position.

10. The seat of claim 8, wherein:
the first seat portion comprises a bottom seat; and
the second seat portion comprises a backrest.

11. A seat comprising:
a first seat portion;
a second seat portion comprising a rotational joint configured to permit rotation of the seat portion about an upper end of the second seat portion between a first orientation in which the second seat portion permits a user to assume a seated position, and a second orientation in which the second seat portion is spaced from and essentially parallel with the first seat portion, a wind deflector provided in a storage compartment of the second seat portion, and joint rods which mount the wind deflector to the second seat portion for movement between a rest position in the storage compartment and an active position out of the storage compartment.

12. The seat of claim 11, wherein the wind deflector integrated into a surface of the second seat portion.

13. The seat of claim 11, wherein the wind deflector is configured for movement in a range between 0 to 270°.

14. The seat of claim 11, wherein the wind deflector is configured for movement in a range between 0 to 90°.

15. The seat of claim 11, wherein the wind deflector, the second seat portion and the joint rods form a joint parallelogram mechanism.

16. The seat of claim 11, wherein the joint rods comprise a first joint rod and a second joint rod which are configured to lock the wind deflector in the active position.

17. The seat of claim 11, wherein:
the first seat portion comprises a bottom seat; and
the second seat portion comprises a backrest.

* * * * *